UNITED STATES PATENT OFFICE.

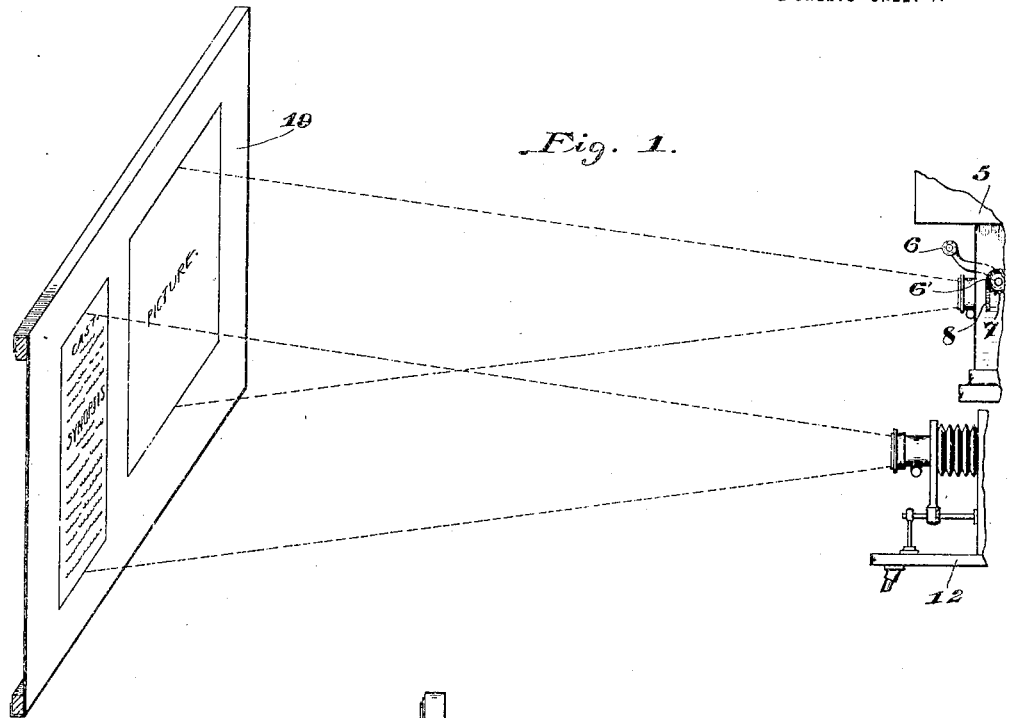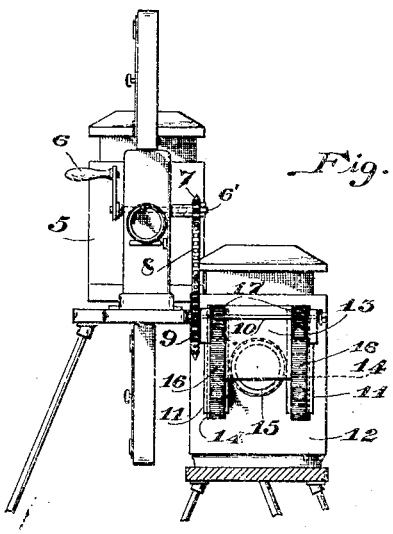

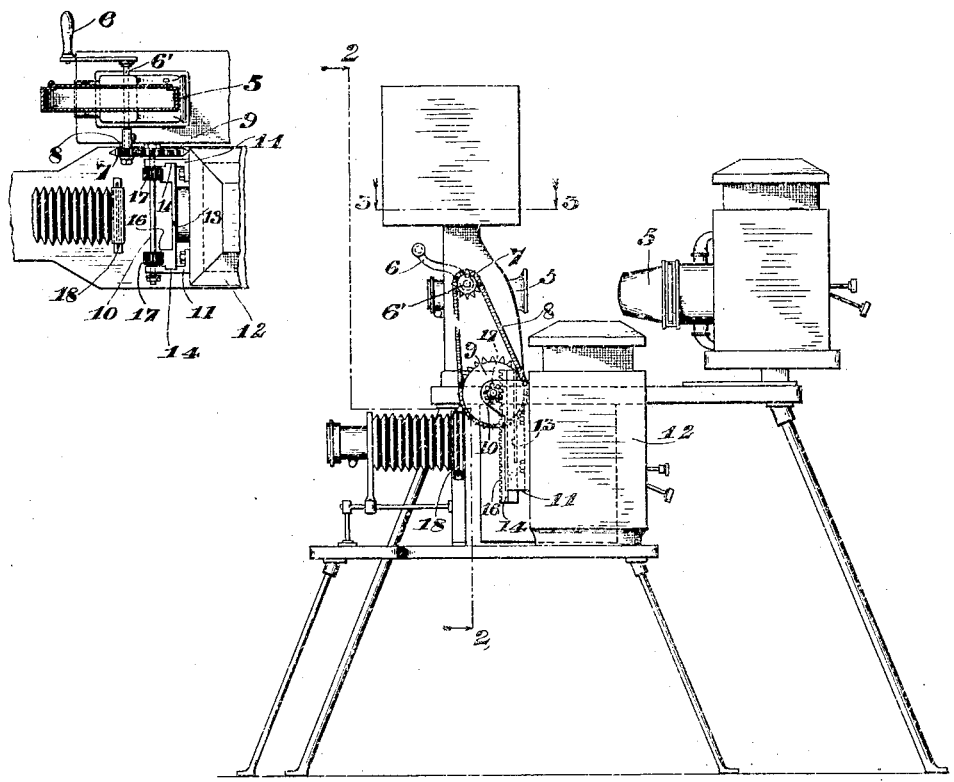

LUKE T. WELCH, OF CHICAGO, ILLINOIS, ASSIGNOR OF ONE-HALF TO JOHN G MANMOSER, OF CHICAGO, ILLINOIS.

MOTION-PICTURE APPARATUS.

1,285,857.

Specification of Letters Patent.   Patented Nov. 26, 1918.

Application filed July 17, 1916.   Serial No. 109,682.

*To all whom it may concern:*

Be it known that I, LUKE T. WELCH, a citizen of the United States, and a resident of the city of Chicago, county of Cook, and State of Illinois, have invented certain new and useful Improvements in Motion-Picture Apparatus, of which the following is a specification.

My invention relates to improvements in motion picture apparatus, and has for its object the provision of an improved apparatus of this character operating to keep an audience constantly informed of the general character of the scenes being shown at any one time and of all preceding scenes.

Other objects will appear hereinafter.

The invention consists in the combinations and arrangements of parts hereinafter described and claimed.

The invention will be best understood by reference to the accompanying drawings forming a part of this specification, and in which:

Figure 1 is a perspective view of an apparatus embodying my invention,

Fig. 2, a sectional view of the same, said section being taken substantially on line 2—2 of Fig. 4, Fig. 3, a horizontal section of the same, said section being taken substantially on line 3—3 of Fig. 4, and Fig. 4, a side view of the apparatus.

The preferred form of the construction, as illustrated in the drawings, comprises a motion picture apparatus 5 of any suitable or desired construction arranged to project such pictures, in the usual manner, and equipped with the usual crank handle 6 and shaft 6' for operating the same. The shaft 6' is extended somewhat at one end and carries a sprocket 7 connected by means of a sprocket chain 8 with a larger sprocket 9 on a transverse shaft 10, mounted in suitable brackets 11 on the housing of an ordinary magic lantern projecting apparatus 12. A shutter 13 is arranged to slide vertically in suitable guides 14 formed in the brackets 11, said shutter being positioned to rest normally in front of the ordinary light emitting opening 15 of the magic lantern housing 12, the lower edge of said shutter being positioned somewhat above the bottom of said opening so as to constantly permit the passage of light from said lower portion.

Rack bars 16 are arranged on opposite sides of shutter 13 and mesh with pinions 17 fixed to shaft 10, the arrangement being such as to cause the shutter 13 to move in unison with the mechanism of the motion picture projecting apparatus.

In use, an ordinary slide 18 is prepared for the magic lantern 12 containing a cast of the characters and a synopsis of the scenes of each picture to be projected from the motion picture apparatus 5, and is properly inserted in the magic lantern at the same time that the film is inserted in the projecting apparatus 5, the magic lantern being positioned relatively to the motion picture apparatus to project the slide 18 onto the usual screen 19, at one side of the motion picture. The arrangement is such that the cast of characters will be constantly visible on said screen and when the motion picture apparatus is started, the synopsis of the different scenes will be gradually uncovered and projected on the screen, at the side of the motion picture, the speed reducing gearing between shafts 6' and 10 being such as to cause such uncovering to correspond with the scenes of the picture being projected. By this means a cast of the characters and a synopsis of the scenes being presented and all preceding scenes are constantly before the audience for their information. Also, a person entering a theater during an exhibition is at once informed as to the status thereof, and is able to readily understand the remaining portions of the picture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of a motion picture apparatus arranged to project such pictures; a second projecting apparatus; a slide for said second apparatus containing a synopsis; means for uncovering said synopsis to correspond with the motion picture, and means for operating said first mentioned apparatus and said slide uncovering means simultaneously, substantially as described.

2. The combination of a motion picture apparatus arranged to project such pictures; a second projecting apparatus coöperating therewith; a slide for said second projecting apparatus containing a cast of characters and a synopsis; a shutter for said second apparatus arranged to constantly uncover the cast portion of said slide; rack bars carried by said shutter; a shaft having pinions meshing with said rack bar; and an operative connection between said shaft and said motion picture apparatus arranged to automatically operate said shutter to uncover the synopsis portion of said slide to correspond with the scenes being shown by said motion picture apparatus, substantially as described.

In testimony whereof I have signed my name to this specification in the presence of two subscribing witnesses.

LUKE T. WELCH.

Witnesses:
JOSHUA R. H. POTTS,
HELEN F. LILLIS